June 20, 1972  R. B. JOHNSON  3,671,113
FILM FEEDING MECHANISM FOR MOTION PICTURE PROJECTORS
Filed March 15, 1971  3 Sheets-Sheet 2

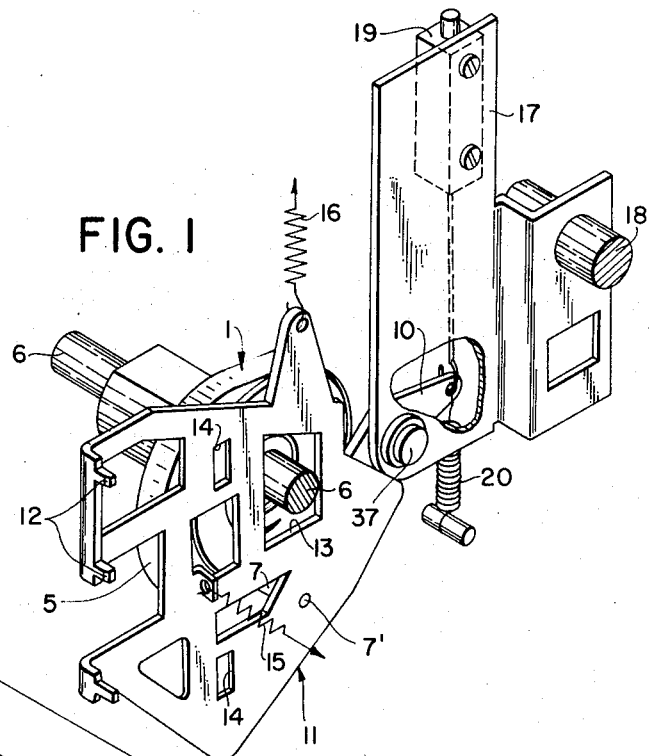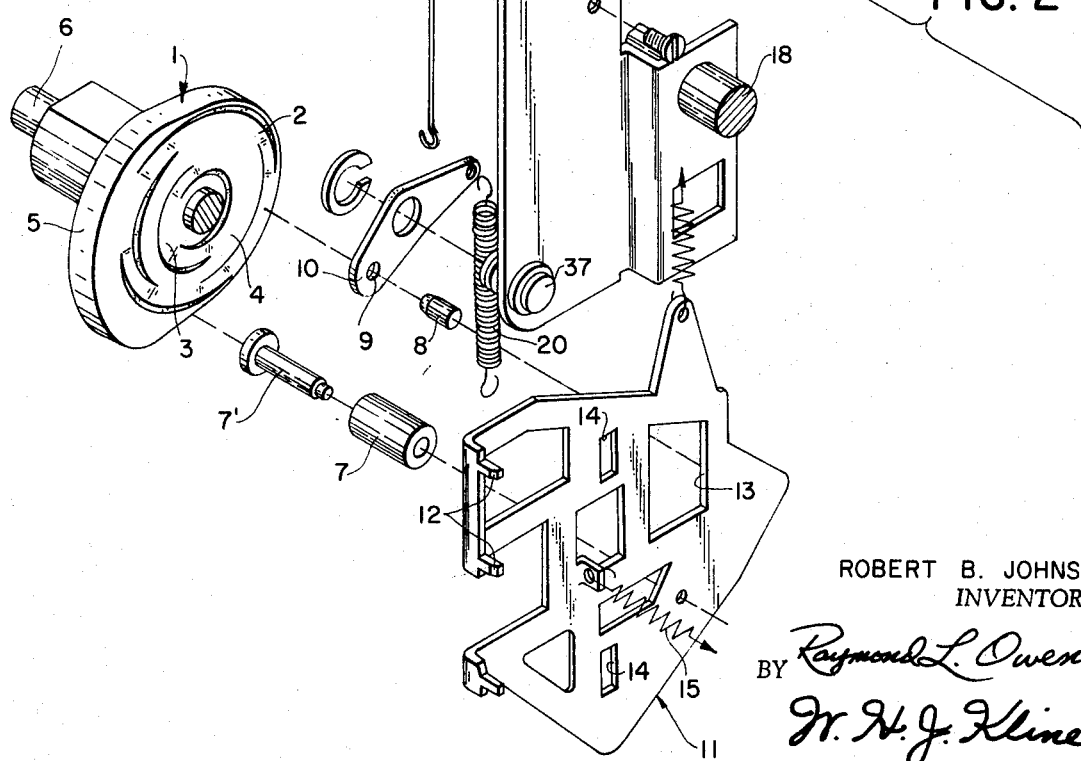

ROBERT B. JOHNSON
INVENTOR.

BY Raymond L. Owens

W. H. J. Kline
ATTORNEYS

June 20, 1972 R. B. JOHNSON 3,671,113
FILM FEEDING MECHANISM FOR MOTION PICTURE PROJECTORS
Filed March 15, 1971 3 Sheets-Sheet 3

ROBERT B. JOHNSON
INVENTOR.

BY Raymond L. Owens
W. H. J. Kline
ATTORNEYS

# United States Patent Office 3,671,113
Patented June 20, 1972

3,671,113
FILM FEEDING MECHANISM FOR MOTION PICTURE PROJECTORS
Robert B. Johnson, Rochester, N.Y., assignor to Eastman Kodak Company, Rochester, N.Y.
Filed Mar. 15, 1971, Ser. No. 124,092
Int. Cl. G03b 1/00
U.S. Cl. 352—173
8 Claims

ABSTRACT OF THE DISCLOSURE

In a film feeding mechanism of the type wherein the engagement of the film claw is effected by a cam follower cooperating with a constant speed cam, the cam is formed with a "still" projection surface and a "motion" projection surface. The follower is locatable on either surface to establish still projection and motion projection at a set rate, and slower projection rates are achieved by an electrically actuable device which moves the follower from the "still" projection surface to the "motion" projection surface at selected frequencies.

BACKGROUND OF THE INVENTION

Field of the invention

This invention relates generally to motion picture projectors, and more specifically to an improved variable rate film feeding mechanism for such projectors.

Description of the prior act

There are in the art numerous motion picture projectors wherein variable projection rates are achieved through the provision of a cam follower which is movable to cooperate with different rotating cam surfaces so as to move a film claw into and out of engagement with the film at frequencies dictated by each cam surface, thus providing for different projection rates, during constant speed reciprocation of the claw in a film advancing direction and constant speed rotation of the in-and-out cam or cams. The rates include fast, slow, normal, and still, in both forward and reverse directions. Usually such arrangements have included a different cam surface for each projection rate (including still projection). Exemplary of projectors of this general type are those disclosed in U.S. Pat. No. 3,212,840 (Roman et al.), U.S. Pat. No. 3,261,654 (Faber et al.), and U.S. Pat. No. 3,463,372 (Kirn).

It is also known in the art to achieve variable projection rates and modes by the provision of circuitry which permits the selection of different electrical signals which effect the in-and-out movements of the claw electromagnetically at different rates. An example is found in U.S. Pat. No. Re. 26,283 (Gerlach).

SUMMARY OF THE INVENTION

It is an object of this invention to provide a film feeding mechanism wherein any number of projection rates are achievable through appropriate control of a movable member forming part of the in-and-out actuator means for the claw, which movable member has a lesser number of basic positions and a corresponding number of basic rates. This is achieved through an arrangement wherein the movable member is positionable at either of its basic positions to effect projection at basic rates, and is switchable from one position to the other at appropriate frequencies to effect projection at other rates.

It is a further object of the invention to provide a basic film feeding mechanism which can be incorporated in a projector to establish basic operating modes, and which, by the addition of suitable electrical accessories, is capable of establishing other desired projection rates. For instance, a basic projector having forward, still and reverse capabilities can have an optional electrical control mechanism which will add thereto various motion projection rates.

In accordance with the preferred embodiment, a rotary in-and-out cam having, for instance, a motion projection cam surface and a still projection cam surface cooperates with a movable follower which is positionable to engage either surface. A solenoid is used for positioning the follower on one surface or the other, and by energizing and de-energizing the solenoid at appropriate frequencies, the follower can be switched from one surface to the other so as to move the claw in-and-out at rates slower than the rate of the motion projection cam surface, thus effective motion projection at slower rates, but without an additional cam surface for each such rate.

Suitable circuitry for energizing the solenoid is disclosed, but the circuitry itself is not considered to be a novel feature of this invention. The energizing signals from the circuit should, of course, be properly timed relative to the motion of the in-and-out cam and the up-and-down reciprocation of the claw.

Preferably the follower is pivotally mounted for movement from one cam surface to the other, and where a cam surface for reverse mode of projection is also included, the pivotal mounting itself of the follower is translated to bring the follower into the working range of the reverse cam surface.

The invention and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is a perspective view, partially fragmentary, of a film feeding mechanism according to the invention, shown in assembled form;

FIG. 2 is an exploded perspective view showing details of the mechanism of FIG. 1;

DESCRIPTION OF THE PREFERRED EMBODIMENT

Figure 3:
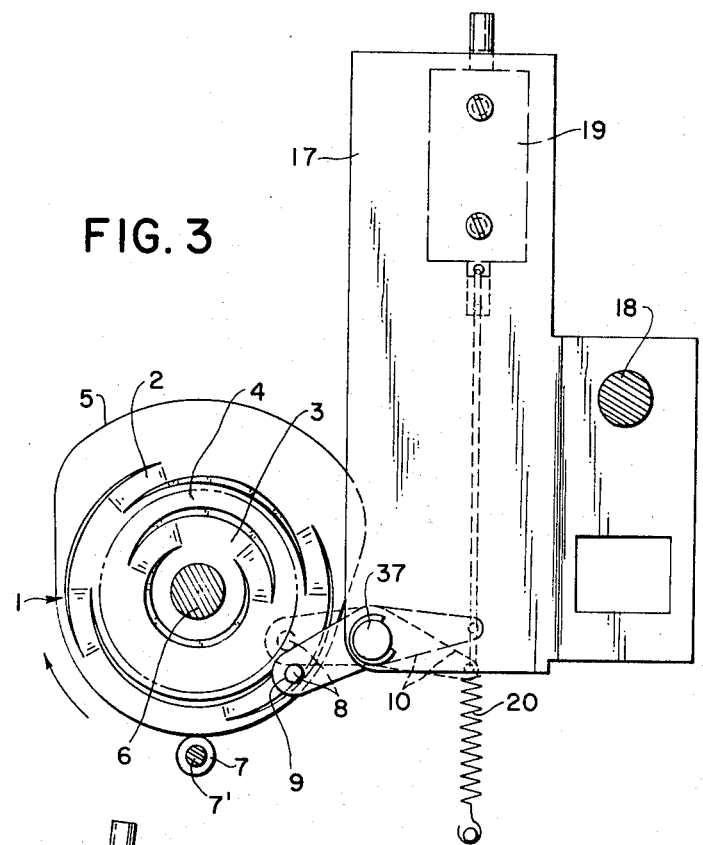
FIG. 3 is a front view of the mechanism illustrating the switching action of the follower in a forward-still projection mode, the claw being omitted for purposes of clarity.

A preferred embodiment of the invention is disclosed in connection with a motion picture projector, although it may find application in other environments. However, because motion picture projectors are well known, the present description and the annexed drawings are directed in particular to elements forming part of, or cooperating more directly with, the present invention, elements not specifically shown or described herein being understood to take various forms well known to those skilled in the art.

Referring to the drawings and particularly to FIGS. 1 and 2, a film feeding mechanism for a motion picture projector is shown to include a film indexing shuttle plate 11 of a generally well known type. The shuttle plate has a bent portion at one end thereof provided with a plurality of film claws 12 designed for movement into and out of perforations in a film, not shown. The shuttle plate 11 has an opening 13 for accommodating a drive shaft 6, and is mounted for vertically oriented up-and-down movement on a pair of steel balls, not shown, which are interposed between recesses 14 in shuttle plate 11, into which the balls will partially extend, and a fixed V-shaped guideway (not shown) secured to the housing of the projector (not shown). The balls thus would provide a vertically oriented pivot axis extending between recesses 14, about which axis the shuttle plate 11 is pivotally movable for moving claws 12 into and out of the perforations in the film. A spring 15 secured to a lug on shuttle plate 11 urges the plate and balls (not shown) into engagement with the guideway (not shown), and, by virtue of its location on one side of the vertically oriented pivot, tends to pivot the plate 11 laterally in the direction of the spring. The balls and guideway cooperating with recesses 14 also permit the free up-and-down movement of the shuttle plate 11.

The vertically oriented up-and-down and laterally oriented pivotal movements of shuttle plate 11 and film claws 12 are achieved by a unitary cam 1 secured to projector drive shaft 6 for rotation therewith. The shuttle plate 11 is provided with a head pin 7' for receiving a sleeve 7 which functions as an up-and-down cam follower. The shuttle plate 11 is urged in a vertical direction by a spring 16 secured to a lug on the plate, causing cam follower 7 to engage the periphery 5 of cam 1. The configuration of the periphery 5 of cam 1 is designed to impart up-and-down movement to shuttle plate 11 upon rotation of the drive shaft 6 and cam 1. By way of example, the face of cam 1 facing plate 11 is illustrated as having three concentric radially spaced annular cam surfaces 2, 3 and 4 of varied configurations which selectively cooperate with an in-and-out cam follower 8. The cam follower 8 is interposed between the face of cam 1 and a surface of shuttle plate 11, and is selectively movable into engagement with one of the cam surfaces 2, 3 and 4 to provide the desired lateral pivotal movement of plate 11 and film claws 12 to achieve, respectively, "forward," "reverse" and "still" projection of the film upon up-and-down motion of the claws, as the follower 8 engages cam surfaces 2, 3 or 4, respectively. The cam follower 8 is supported for axial movement in an opening 9 in a follower arm or lever 10 pivotally mounted on a stub shaft 37, and the follower is constantly urged by spring 15 and plate 6, bearing against one end of follower 8, into engagement with the face of cam 1.

Figure 4:
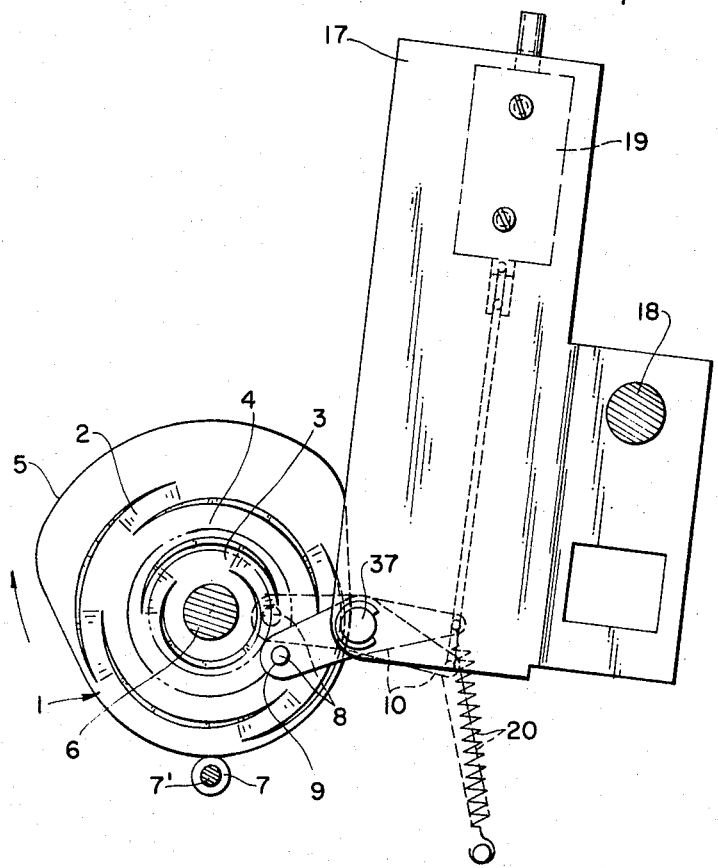
FIG. 4 corresponds to FIG. 3, but illustrates the mechanism in a reverse-still projection mode.

Stub shaft 37 upon which follower arm 10 is pivotally mounted is carried by a reversing lever 17, which in turn is mounted on the projector housing for pivotal movement about lever pivot 18. A solenoid 19 is also carried by lever 17, and is coupled to follower arm 10 as shown in FIG. 1 for controlling the position and movement of follower arm 10, and hence follower 8, in opposition to follower arm return spring 20. In the illustrated embodiment, when the solenoid is not energized, spring 20 is permitted to pivot follower arm 10 to a position in which follower 8 engages cam surface 4, corresponding to "still" projection, as shown in broken lines in FIG. 3. Also as illustrated in FIG. 3, energization of the solenoid pivots the follower arm and moves follower 8 into engagement with cam surface 2, corresponding to "foward" motion projection. From FIG. 4 it will be noted that opposite conditions apply when reversing lever 17 is pivoted to the reverse projection position shown in FIG. 4. Thus, in the condition illustrated in FIG. 4, when the solenoid is deenergized, cam follower 8 is moved by spring 20 into engagement with cam surface 3, corresponding to reverse motion projection, and when the solenoid is energized, cam follower 8 is moved into engagement with cam surface 4, corresponding to still projection. This reversal of conditions is easily accommodated through a phase reversal of the control system for the solenoid, as will appear subsequently, or by a switching arrangement automatically responsive to the position of reversing lever 17. The illustrated arrangement actually incorporates into the system a safety factor against improper engagement of the claw with the film, in that the cam follower must go through a "still" projection condition when passing from forward to reverse, or vice versa. Thus, with lever 17 in the position illustrated in FIG. 3, and with the solenoid energized to effect forward motion projection, shifting of the reversing lever 17 to the reverse position would move the follower to the "still" cam surface, where it would remain until moved to the "reverse" cam surface upon deenergization of the solenoid.

The basic operation of the mechanism will be clear from the foregoing description and illustration, that is, the follower can be positioned to effect either forward, or reverse, or still projection. This is achieved in a manner similar to that of Kirn Pat. No. 3,463,372, referred to previously herein. However, the mechanism of the instant invention, including the solenoid actuator, is capable of effecting motion projection at rates other than those effected by cam surfaces 2 and 3. This is achieved by suitable on-off operation of the solenoid. In other words, through suitable circuitry, the following signals could be chosen, by switch, to actuate the solenoid:

(a) Voltage to solenoid continuously "on";

(b) Voltage "on" one revolution, "off" the next revolution in continuously alternating fashion;

(c) Voltage "on" for one revolution, "off" for two revolutions, etc.;

(d) Voltage "on" for one revolution, "off" for three revolutions, etc.;

(e) Voltage "on" for one revolution, "off" for four revolution, etc.;

(f) And so on.

Considering the foregoing operational signals, let it be assumed that the cam rotates at 36 revolutions per second, and that the motion projection cam surfaces are configured to pull down one frame of film during each revolution. Under these conditions, to obtain 36 frames per second forward operation, the solenoid may be simply turned "on" and left "on," causing the cam follower to remain on the outermost in-and-out cam circle, as illustrated in FIG. 3. To obtain 18 frames per second forward operation, the solenoid may be switched "on" and "off" as in b above. In a similar manner, 12 frames per second, 9 frames per second, and slower rates may be achieved by simply "parking" the follower on the still cam surface for a greater number of revolutions, as indicated in c through f above. The timing is such that the lateral movement of the follower always occurs in the area where the "still" and in-and-out cams are at the same level, so that there is no obstruction to the follower movement. Reverse operation is obtained by rotating the lever 17 on which the follower arm and solenoid are mounted, so that actuation of the solenoid causes the follower to be switched between the still cam and the innermost cam circle, which controls reverse claw action. As previously pointed out, a phase reversal of the electrical or electronic control system is required to obtain the same rates as in forward operation. The positioning of lever 17 may be done manually, or with another solenoid if remote control is desired.

In the foregoing description of operation at 36 frames per second, the voltage to the solenoid was referred to as being continuously "on." However, it will be immediately apparent that the voltage need be "on" only during that part of the rotation of the cam during which engagement and pull down of the film by the claws is to occur. In other words, during the dwell times at the top and bottom of an up-and-down stroke of the claws, and during the return stroke, the claws are disengaged from the film perforations regardless of whether the follower is on one of the motion projection cam surfaces or on the still cam surface. Therefore, it should be kept in mind that for motion projection, the follower can be located on the motion projection cam surface for the entire rotation of the cam, or it can be located on the motion projection cam surface only during the engagement and pull down phase of the rotation of the cam, being "parked" on the still cam surface at all other times. In this latter mode of operation, the follower thus would be moved laterally back-and-forth between adjacent cam surfaces during projection at 36 frames per second as well as all slower projection rates. The requirement that the solenoid be "on" during a rotation of the cam thus should be considered as meaning that the solenoid must be effectively "on" during the "action" part of the rotation.

Figure 5:
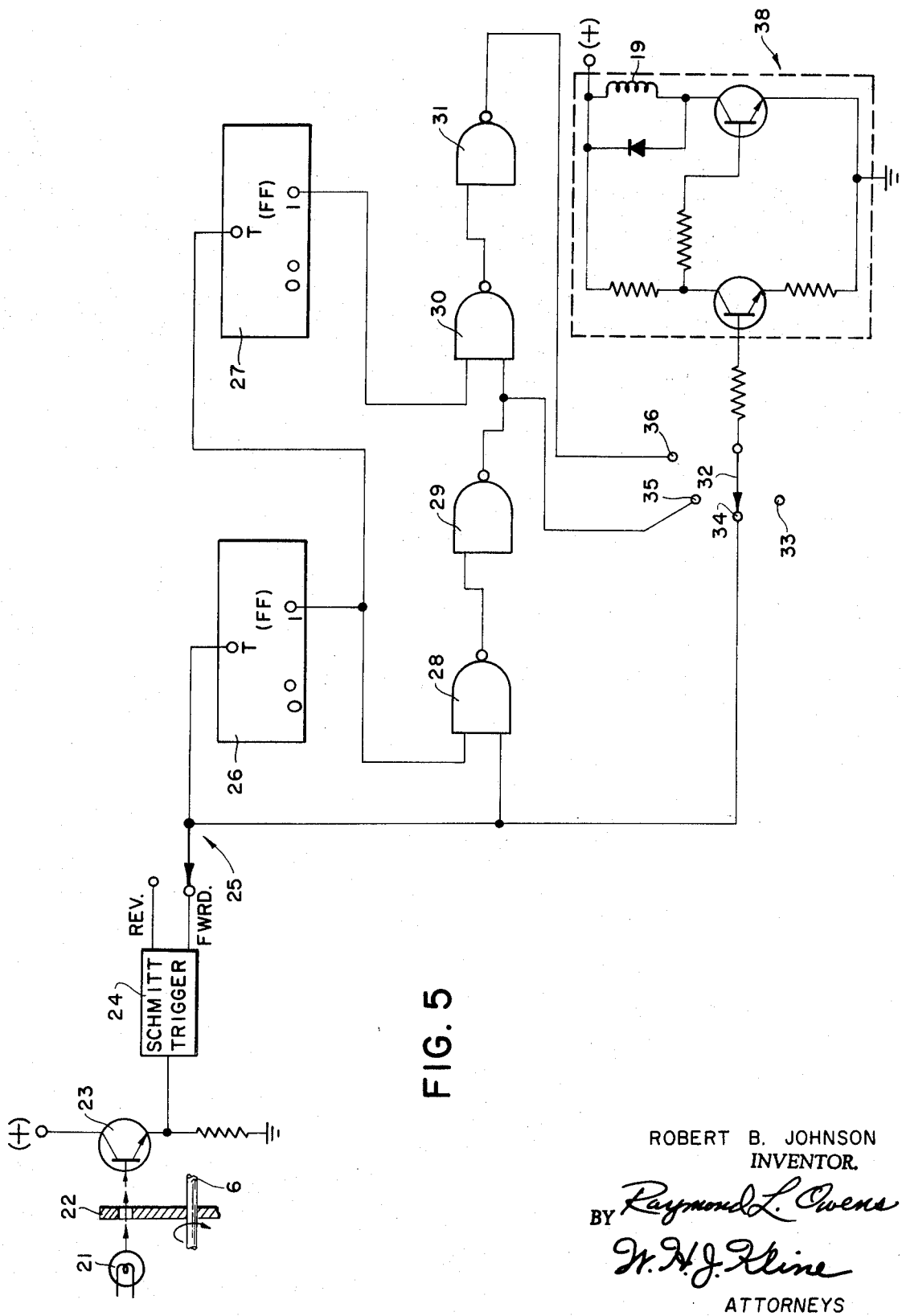
FIG. 5 is a diagrammatic illustration of an exemplary control circuit using logic gates which are shown in accordance with American Standard Graphic Symbols for Logic Diagrams (ASA Y 32.14–1962).

Any convenient form of signal source for energization of the solenoid may be adopted. For instance, a signal source of the type shown in Gerlach Patent Re. 26,283 could be adapted for use with the instant invention. Another exemplary form of signal circuit is illustrated diagrammatically in FIG. 5. The electronic control circuit shown therein consists of a lamp, a timing disc, a phototransistor, and suitable circuitry, including selector switches, whereby appropriate signals can be chosen for the operation of the solenoid. The timing disc, of course, would be attached to the cam assembly, or otherwise coordinated with the rotation of the cam to ensure proper timing. Basically, the circuit includes two trigger flip-flops which provide level mode outputs having a frequency of one-half and one-fourth, respectively, of that of the light pulses passed by the timing disc. The appropriate driving signals for the solenoid are obtained from the output of NAND gates which convert the level mode outputs into pulses. Referring to FIG. 5, the lamp, timing disc and phototransistor are shown at 21, 22 and 23 respectively. The phototransistor 48 is a junction transistor and is disposed so that light transmitted through the aperure in the timing disc 22 impinges upon its base electrode. Illumination of the phototransistor 23 is effective to increase the current flow through the reverse biased transistor, emitter-collector junction. The emitter electrode of the phototransistor 23 is coupled to a Schmitt trigger circuit 24 and provides a pulse type signal to the circuit 24 each time the phototransistor 23 is illuminated. The Schmitt trigger circuit 24 produces a square wave type output over two selectable output lead lines, forward and reverse lines respectively. The output signals over these lines are 180° out of phase with each other. So, for example, if the output signal over the reverse line is at relatively bright level, the signal at the forward lead will be relatively low. A selector switch 25 selectively couples either the "forward" or "reverse" output leads to the remaining solenoid control circuit gates. The arrangement is such that if the switch 25 is connected to the forward lead, the film feeding mechanism will have been set to operate in the "forward" projection mode, whereas if the switch 25 is connected to the reverse lead, then the film feeding mechanism will have been set to operate in the "reverse" projection mode. The trigger flip-flops (F/F) are shown at 26 and 27, and the NAND gates are shown at 28–31. If the signal at the output of the Schmitt trigger 24 is considered to be at a frequency $f_o$, then the signal at the output of the F/F 26 is at a frequency of $f_o/2$ and the signal at the output of F/F 27 is at a frequency of $f_o/4$. The NAND gate 28 is responsive to the signal from the Schmitt trigger and F/F 26 and in turn has its output coupled to NAND gate 29 which acts as an inverter (since it has but one input signal). NAND gate 30 is responsive to the signals from F/F 27 and NAND gate 29 has its output coupled to NAND gate 31 which also acts as an inverter. A frame rate selector switch 32 selects the desired solenoid control signal from four available sources 33–36. The selected signal controls a solenoid driver indicated generally at 38, for engergizing and de-energizing solenoid 19. The solenoid driver 38 is of a conventional variety well understood to those skilled in the art, and for that reason will not be described in further detail. An exemplary range of operations using this circuitry could include still projection when switch 32 is moved to 33, 36 frames per second when moved to 34, 18 frames per second when moved to 35, and 9 frames per second when moved to 36. Since the pulse rate to the solenoid driver controls the energization rate of the solenoid, switch position 33 would correspond to a continuously de-energized state, permitting the flower arm return spring to position the follower continuously on the "still" cam surface. The pulse rate in switch position 34 would energize the solenoid during at least the claw engagement and pull down phase of each rotation of the cam (or during the entire rotation of the cam), and thus with the cam rotating at 36 revolutions per second, the film would be pulled down one frame during each revolution, or at a rate of 36 frames per second. The pulse rate at switch position 35 would be such as to energize the solenoid during at least the claw engagement and pull down phase of one rotation of the cam, and to de-energize the solenoid during the subsequent rotation of the cam, thus "parking" the follower on the "still" cam surface during this subsequent rotation, followed by energization during the next rotation, etc. On moving to reverse projection, switch 25 would be moved to the reverse position to provide the required reversal of signals. The position of switch 25 could, of course, be made responsive to the position of lever 17.

Because it is possible to move the follower radially on the cam surfaces a substantial amount without materially affecting claw action, oscillation of the solenoid at the end of its stroke will not produce erratic claw action. Thus, elastic materials can be used to cushion the solenoid movement to minimize noise.

The projector could be manufactured and sold as a basic projector capable of certain modes of operation, and various electrical or electronic control systems could be offered to extend the operational modes in accordance with the desires of the user. Hence, adaptability and flexibility are noteworthy features of the invention.

The invention has been described in detail with particular reference to a preferred embodiment thereof, but it will be understood that variations and modifications can be effected within the spirit and scope of the invention as described hereinabove and as defined in the appended claims.

I claim:

1. In an intermittent film feeding mechanism for a motion picture projector, the combination comprising:
    (a) a film claw mounted for up-and-down movement in a film advancing direction and in-and-out movement in a film engaging and disengaging direction relative to a film to advance the film through the projector;
    (b) means for reciprocating said claw in said up-and-down direction;
    (c) in-and-out actuator means, including a member movable between first and second positions, for effecting in-and-out movement of said claw to feed the film at a first rate when said member is in said first position, and for effecting continuous disengagement of said claw when said member is in said second position, during continuous reciprocation of said claw in said up-and-down direction; and
    (d) selectively operable means for moving said member to said first position for projection at said first rate or to said second position for still projection and for automatically moving said member back-and-forth between said positions at a selected frequency and in timed relationship with the up-and-down reciprocation of said claw for projection at a rate slower than said first rate.

2. A film feeding mechanism as claimed in claim 1 wherein said selectively operable means comprises selectively energizable electrical means.

3. A film feeding mechanism as claimed in claim 1 wherein said selectively operable means includes a solenoid coupled to said movable member, and electrical circuit means selectively controllable to energize and de-energize said solenoid in accordance with the desired mode of projection.

4. A film feeding mechanism as claimed in claim 3 wherein said circuit means comprises a signal source for continuous energization of said solenoid, a signal source for continuous de-energization of said solenoid, and a signal source for intermittent energization of said solenoid in timed relationship with the up-and-down reciprocation of said claw, and switch means for connecting the solenoid to any of said signal sources.

5. A film feeding mechanism as claimed in claim 3 wherein said movable member is a cam follower, and said in-and-out actuator means includes a rotary cam mounted for unidirectional rotation at constant speed in timed relationship with the up-and-down reciprocation of said claw.

6. A film feeding mechanism as claimed in claim 5 wherein said cam includes a cam surface for effecting motion projection at said first rate, and an adjacent surface for effecting still projection.

7. A film feeding mechanism as claimed in claim 6 wherein said follower is carried by a pivotally mounted lever to which said solenoid is coupled, and said lever is located such that pivotal movement thereof moves the follower from one surface to the other.

8. A film feeding mechanism as claimed in claim 7 wherein said cam includes a verse projection surface, and further comprising means for moving the pivot of said pivotally mounted lever to a position wherein pivotal movement thereof moves the follower between said reverse projection surface and said still projection surface.

References Cited

UNITED STATES PATENTS

| | | | |
|---|---|---|---|
| Re. 26,283 | 10/1967 | Gerlach | 226—50 |
| 3,463,372 | 8/1969 | Kirn | 226—49 |
| 3,471,227 | 10/1969 | McClellan | 352—173 X |
| 3,212,840 | 10/1965 | Roman | 226—62 X |
| 3,536,389 | 10/1970 | Reinsch | 352—194 X |
| 3,402,007 | 9/1968 | Gerlach | 352—194 X |
| 3,261,654 | 7/1966 | Faber | 352—194 |
| 3,584,774 | 6/1971 | Kadowaki | 226—62 |
| 3,520,596 | 7/1970 | O'Donnel | 352—92 |
| 2,834,832 | 5/1958 | Somers | 352—191 X |
| 2,588,813 | 3/1952 | Dube | 352—173 |

SAMUEL S. MATTHEWS, Primary Examiner

M. H. HAYES, Assistant Examiner

U.S. Cl. X.R.

226—62; 352—194